United States Patent
Ma et al.

(10) Patent No.: US 12,436,305 B2
(45) Date of Patent: Oct. 7, 2025

(54) AUTOMATIC TYING STRUCTURE MAPS OF SUBSURFACE HORIZONS TO WELL-DERIVED ORIENTATION INFORMATION

(71) Applicant: SAUDI ARABIAN OIL COMPANY, Dhahran (SA)

(72) Inventors: Yue Ma, Beijing (CN); Xu Ji, Dhahran (SA); Yubing Li, Beijing (CN); Yi Luo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/008,081

(22) PCT Filed: Jul. 26, 2022

(86) PCT No.: PCT/CN2022/107763
§ 371 (c)(1),
(2) Date: Dec. 2, 2022

(87) PCT Pub. No.: WO2024/020763
PCT Pub. Date: Feb. 1, 2024

(65) Prior Publication Data
US 2024/0264324 A1    Aug. 8, 2024

(51) Int. Cl.
*G01V 1/30* (2006.01)
*G01V 11/00* (2006.01)

(52) U.S. Cl.
CPC .............. *G01V 1/302* (2013.01); *G01V 11/00* (2013.01); *G01V 2210/643* (2013.01)

(58) Field of Classification Search
CPC .......... G01V 1/302; G01V 1/50; G01V 11/00; G01V 2210/643; G01V 2210/6169; G01V 2210/641
See application file for complete search history.

(56) References Cited

U.S. PATENT DOCUMENTS 7,557,581 B2   7/2009   Ostermeier et al.
8,095,318 B2   1/2012   Heliot et al.
(Continued)

FOREIGN PATENT DOCUMENTS

CA    2 804 354 A1    8/2014
CN    102253411 A    11/2011
(Continued)

OTHER PUBLICATIONS

Automatic integration of 3D reflection seismic and well-measured orientation in sedimentary, Society of Exploration Geophysicists, published 2021, provided by the applicant as IDS. (Year: 2021).*
Y. Ma, et al., "Automatic integration of 3D reflection seismic and well-measured orientation in sedimentary basins", First International Meeting for Applied Geoscience & Energy, 2021, pp. 1131-1135 (5 pages).
(Continued)

Primary Examiner — Catherine T. Rastovski
Assistant Examiner — Lal Ce Mang
(74) Attorney, Agent, or Firm — Osha Bergman Watanabe & Burton LLP

(57) ABSTRACT

Methods and systems are disclosed for automatically integrating subsurface structural maps with strike and dip information measured in subsurface wells. The method includes obtaining a seismic image volume for a subsurface region of interest and a well log for each of a plurality of wellbores penetrating the subsurface region of interest. Further, the method includes determining a seismic map of a geological surface from the seismic image volume, wherein the seismic map comprises an estimated depth and an estimated vector normal to the seismic map at a plurality of horizontal locations and determining an intersection point for each of the plurality of wellbores with the geological surface. Additionally, the method includes forming a cost function based, at least in part, on the seismic map and the intersection points of the plurality of wellbores and constructing a subsurface map by solving a constrained optimization problem based on the cost function.

12 Claims, 6 Drawing Sheets

(56) References Cited

U.S. PATENT DOCUMENTS

| | | | |
|---|---|---|---|
| 8,931,580 B2* | 1/2015 | Cheng | E21B 43/30 166/369 |
| 9,581,710 B2 | 2/2017 | Leiceaga | |
| 10,877,171 B2 | 12/2020 | Ramsay et al. | |
| 2008/0236270 A1 | 10/2008 | Denichou et al. | |
| 2009/0157361 A1 | 6/2009 | Toghi et al. | |
| 2010/0149917 A1 | 6/2010 | Imhof et al. | |
| 2013/0085676 A1* | 4/2013 | Sonneland | G01V 1/301 702/11 |
| 2016/0320512 A1* | 11/2016 | Zhao | G01V 1/48 |
| 2016/0364508 A1 | 12/2016 | Glazkova et al. | |
| 2020/0011167 A1* | 1/2020 | Zhao | E21B 44/00 |
| 2020/0033501 A1 | 1/2020 | Nyrnes et al. | |
| 2020/0300064 A1 | 9/2020 | Gee et al. | |
| 2022/0129788 A1* | 4/2022 | Zhang | E21B 49/00 |

FOREIGN PATENT DOCUMENTS

| | | |
|---|---|---|
| CN | 104520734 A | 4/2015 |
| CN | 106934858 A | 7/2017 |
| CN | 109267996 A | 1/2019 |
| CN | 112987086 A | 6/2021 |
| CN | 114562244 A | 5/2022 |
| EP | 0796442 B1 | 12/2001 |
| WO | 2009/126375 A1 | 10/2009 |
| WO | 2013/164685 A2 | 11/2013 |
| WO | 2018/156354 A1 | 8/2018 |
| WO | 2020/222050 A1 | 11/2020 |
| WO | 2022/050967 A1 | 3/2022 |

OTHER PUBLICATIONS

F. Yong et al., "Estimation of lateral correlation length from deep seismic reflection profile based on stochastic model", Acta Geophysica, 2021, vol. 69, pp. 1297-1312 (16 pages).

International Search Report and Written Opinion of the International Searching Authority issued in corresponding International Application No. PCT/CN2022/107763, mailed Apr. 26, 2023 (9 pages).

International Search Report and Written Opinion of the International Searching Authority issued in corresponding International Application No. PCT/CN2023/074354, mailed May 23, 2023 (9 pages).

Stewart, S.A., 2018. Generalization and multiscale structure of subsurface structural maps. Interpretation 6, T1045- T1054 (10 pages).

Stewart, S.A., 2020, Scale dependence of strike and dip in sedimentary basins: Implications for field measurements and integrating subsurface datasets, Journal of Structural Geology, 131, 103943 (8 pages).

Thore, P., Shtuka, A., Lecour, M., Ait-Ettajar, T., Cognot, R., 2002. Structural uncertainties: Determination, managment, and applications. Geophysics 67, 840-852 (13 pages).

V. Tschannen et al; "Extracting Horizon Surfaces from 3D Seismic Data using Deep Learning"; Geophysics, vol. 85, No. 3, pp. N17-N26; May-Jun. 2020 (10 pages).

Non-Final Office Action issued in related U.S. Appl. No. 18/263,319 dated Dec. 16, 2024 (11 pages).

* cited by examiner

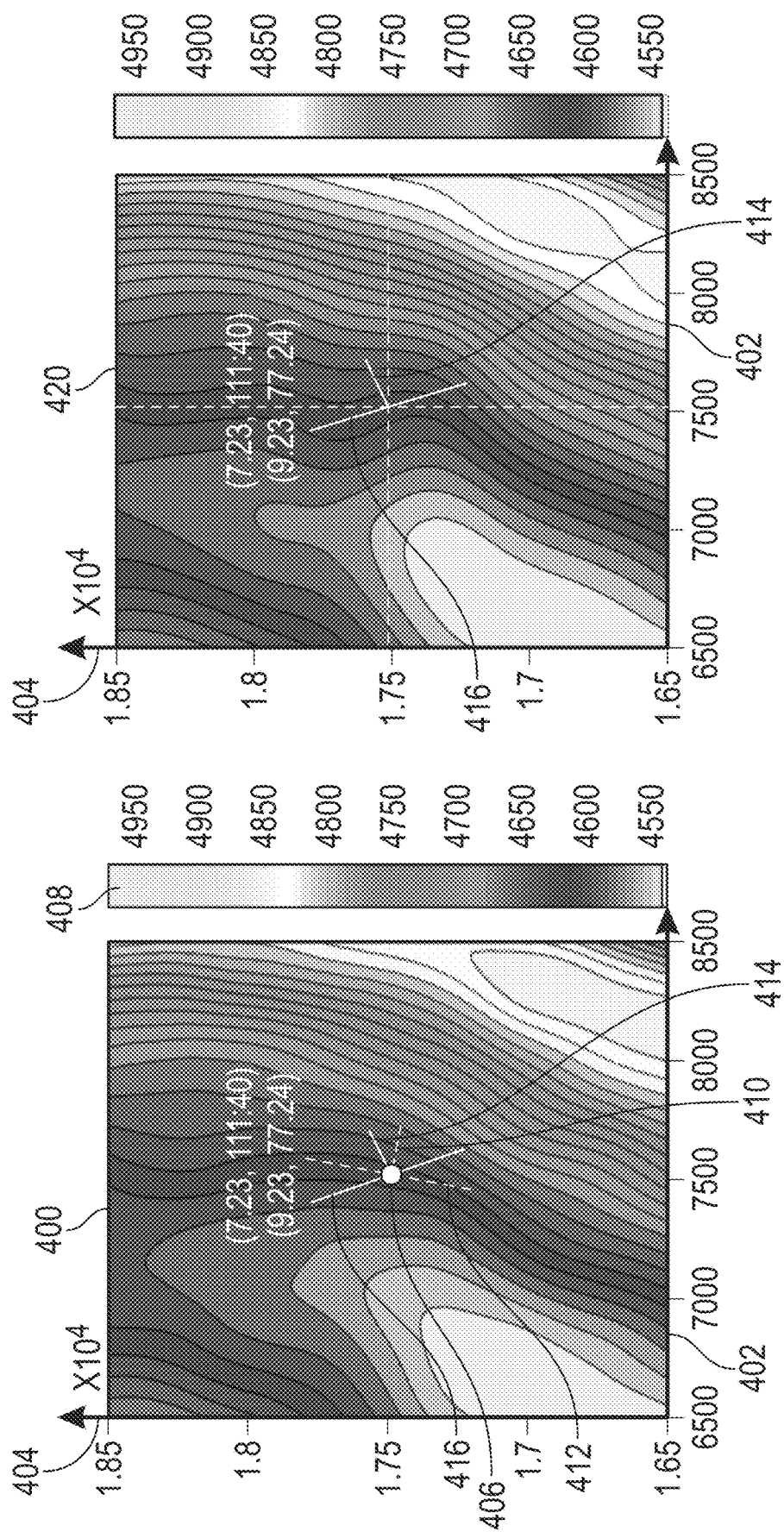

AUTOMATIC TYING STRUCTURE MAPS OF SUBSURFACE HORIZONS TO WELL-DERIVED ORIENTATION INFORMATION

BACKGROUND

Three-dimensional ("3D") reflection seismic interpretation involves generation of structure maps of subsurface horizons over large areas. In order to be correlated with well measurements, maps made from 3D reflection seismic are often depth-correlated at well control points. However, orientation information measured in wells penetrating the subsurface horizons may not be used when creating or updating the maps due to, among other things, the absence of upscaling guidelines. Successful projection of stratigraphic features in the subsurface is typically dependent on the ability of a geologist to reconstruct the geological history, including interpretations of the depositional environment for the stratigraphic section. Specific types of stratigraphic traps, such as reefs and sandstone bars, have been recognized from a well log where known patterns of dip over the flanks of such features help to define their position with respect to the borehole. Dipmeter data are treated only statistically and incorporated with other log data for defining the structural and textural patterns of stratigraphic features.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method, which includes obtaining a seismic image volume for a subsurface region of interest and obtaining a well log for each of a plurality of wellbores penetrating the subsurface region of interest. Further, the method includes determining a seismic map of a geological surface from the seismic image volume, wherein the seismic map comprises an estimated depth and an estimated vector normal to the seismic map at a plurality of horizontal locations, and determining an intersection point for each of the plurality of wellbores with the geological surface, wherein the intersection point comprises a depth, a horizontal location, and a strike and a dip of the geological surface. Additionally, the method includes forming a cost function based, at least in part, on the seismic map and the intersection points of the plurality of wellbores and constructing a subsurface map by solving a constrained optimization problem based on the cost function.

In one aspect, the invention relates to a non-transitory computer readable medium storing program instructions. The instructions, when executed, obtain a seismic image volume for a subsurface region of interest and obtain a well log for each of a plurality of wellbores penetrating the subsurface region of interest. The instructions, when executed, further determine a seismic map of a geological surface from the seismic image volume, wherein the seismic map comprises an estimated depth and an estimated vector normal to the seismic map at a plurality of horizontal locations and determine an intersection point for each of the plurality of wellbores with the geological surface, wherein the intersection point comprises a depth, a horizontal location, and a strike and a dip of the geological surface. The instructions, when executed, further form a cost function based, at least in part, on the seismic map and the intersection points of the plurality of wellbores and construct a subsurface map by solving a constrained optimization problem based on the cost function.

In one aspect, embodiments disclosed herein relate to a system which includes a logging system, a drilling system, and a well log interpreter comprising a computer processor. The logging system is coupled to a plurality of logging tools. Further, the drilling system is coupled to the logging system. Further, the well log interpreter includes a computer processor and the well log interpreter is coupled to the logging system and the drilling system. Specifically, the well log interpreter is configured to obtain a seismic image volume for a subsurface region of interest and to obtain a well log for each of a plurality of wellbores penetrating the subsurface region of interest. Further, the well log interpreter is configured to determine a seismic map of a geological surface from the seismic image volume, wherein the seismic map comprises an estimated depth and an estimated vector normal to the seismic map at a plurality of horizontal locations and to determine an intersection point for each of the plurality of wellbores with the geological surface, wherein the intersection point comprises a depth, a horizontal location, and a strike and a dip of the geological surface. Additionally, the well log interpreter is configured to form a cost function based, at least in part, on the seismic map and the intersection points of the plurality of wellbores and construct a subsurface map by solving a constrained optimization problem based on the cost function.

Other aspects and advantages of the claimed subject matter will be apparent from the following description and the appended claims.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

FIGS. 4A and 4B shows exemplary subsurface maps.

DETAILED DESCRIPTION

Figure 1:
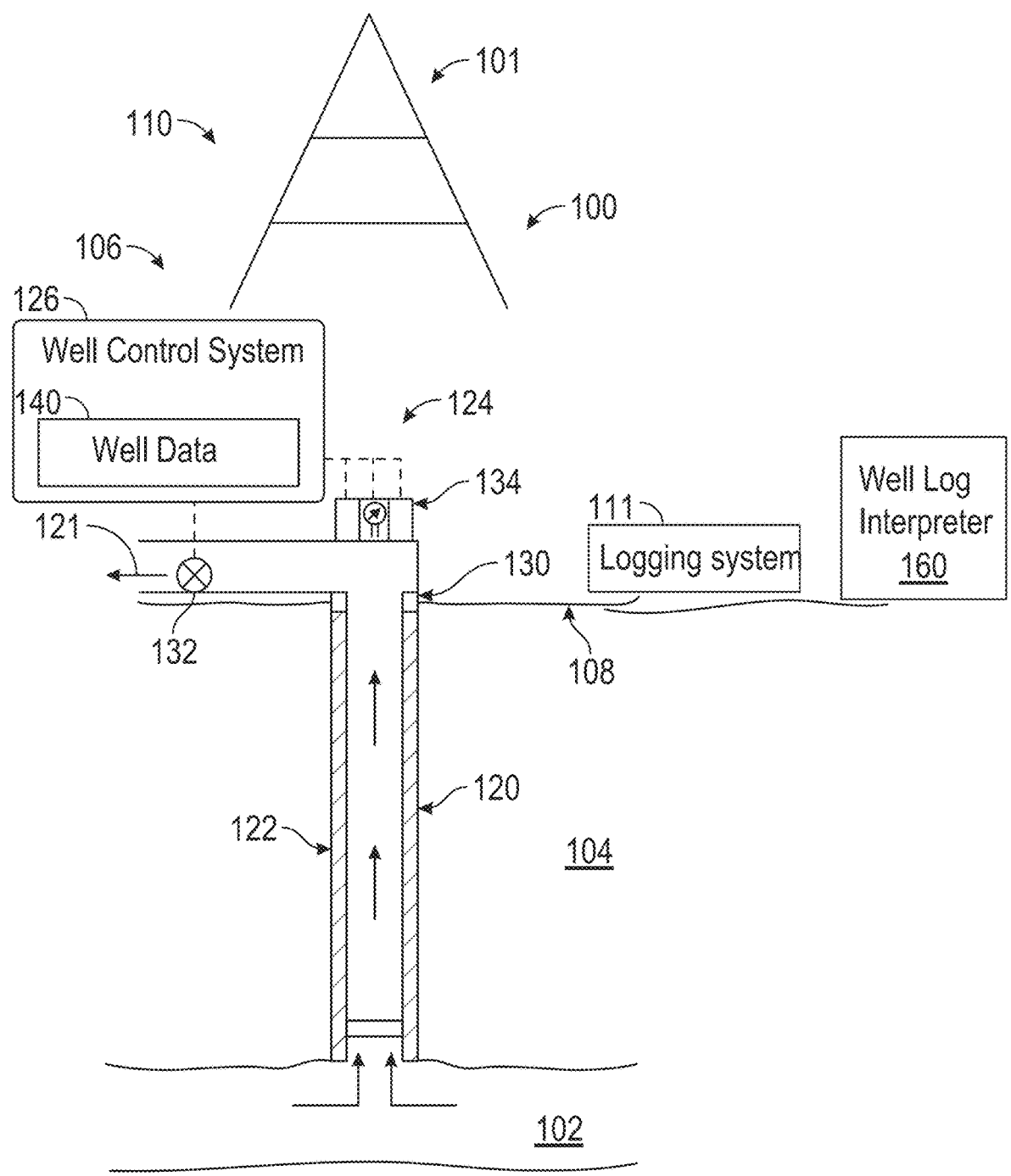
FIG. 1 shows a system in accordance with one or more embodiments.

In the following detailed description of embodiments disclosed herein, numerous specific details are set forth in order to provide a more thorough understanding disclosed herein. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein provide a method and system for automatically integrating subsurface structural maps with strike and dip information measured in subsurface wells, where dips and strikes are the measured orientation angles of geological surface at each intersection point. By applying the system and method to a 3D reflection seismic horizon, this disclosure illustrates the capability of embodiments to tie subsurface maps to both depth and orientation information automatically. The system and method, in accordance with some embodiments, firstly uses a Gaussian filter to extend an orientation variation between a subsurface horizon and an image log at well control points within a predefined radius of influence. Then an interpolation is used to generate an updated subsurface map that is consistent with the image log with respect to the orientation information as well as depth at all relevant well locations.

Further, individual 3D reflection seismic image volume, usually acquired in pursuit of hydrocarbons, may cover large areas of sedimentary basins, up to tens of thousands of square kilometers in area with merged volumes extending over a hundred thousand square kilometers. Standard spatial resolution of these volumes yields mapped subsurface for interpretation on regular Cartesian coordinates with a spacing of 25 m or 12.5 m. Maps are tied to a correct depth at all well control locations. Structural orientation information is measured on the image logs from the wells and during mapping operations. Utilizing a well orientation introduces a benefit that, besides a well control locations, mapped structures are not dependent only on a seismic imaging and depth conversion process, and thus minimizing uncertainty. Therefore, the interpreted seismic horizons are more geometrically accurate, in terms of orientation and curvature.

In low-relief structural and stratigraphic areas with very few wells, minor changes in orientation can lead to significant variations in spatial distribution and volume of hydrocarbon traps. For example, volumes of a stratigraphic trap imposed on a low relief structure may increase 17% after including the orientation information in the structural maps. The best practice is to ensure that well logging orientation data is used to influence the structure when creating a map from seismic interpretation, so that a final grid matches the orientation as well as depth of a relevant horizon in available wells. In one or more embodiments, this disclosure integrates of scale-dependent orientation information and interprets maps of geological horizons in sedimentary basins.

FIG. 1 shows a schematic diagram in accordance with one or more embodiments. As shown in FIG. 1, a well environment (100) includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath a geological surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments, the well system (106) includes a rig (101), a drilling system (110), a logging system (111), a wellbore (120), a well subsurface system (122), a well surface system (124), and a well control system ("control system") (126). The drilling system (110) may include a drill string, a drill bit, and a mud circulation system for use in drilling the wellbore (120) into the formation (104). The logging system (111) may include one or more logging tools, for use in generating well logs, based on the sensing system (134), of the formation (104). The well control system (126) may control various operations of the well system (106), such as well production operations, well drilling operation, well completion operations, well maintenance operations, and reservoir monitoring, assessment and development operations. In some embodiments, the well control system (126) includes a computer system that is the same as or similar to that of a computer system (600) described below in FIG. 6 and the accompanying description.

The rig (101) is a combination of equipment used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment.

The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) lowered into the hydrocarbon-bearing formation (104) or the reservoir (102) during monitoring operations (e.g., during in situ logging operations).

In some embodiments, during operation of the well system (106), the well control system (126) collects and records well data (140) for the well system (106). During drilling operation of the well (106), the well data (140) may include mud properties, flow rates, drill volume and penetration rates, formation characteristics, etc. In some embodiments, the well data (140) are recorded in real time, and are available for review or use within seconds, minutes or hours of the condition being sensed (e.g., the measurements are available within 1 hour of the condition being sensed). In such an embodiment, the well data (140) may be referred to as "real-time" well data (140). Real-time well data (140) may enable an operator of the well (106) to assess a relatively current state of the well system (106), and make real-time decisions regarding a development of the well system (106) and the reservoir (102), such as on-demand adjustments in drilling fluid and regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the geological surface (108). The wellhead (130) may include structures for supporting (or "hanging") casing and production tubing extending into the wellbore (120). Production (121) may flow through the wellhead (130), after exiting the wellbore (120) and the well subsurface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable the unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include a set of high-pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120). The surface sensing system (134) may also include sensors for sensing characteristics of the rig (101), such as bit depth, hole depth, drilling fluid flow, hook load, rotary speed, etc.

In some embodiments, the well system (106) includes a well log interpreter (160). For example, the well log interpreter (160) may include hardware and/or software with functionality for generating one or more reservoir models regarding the hydrocarbon-bearing formation (104) and/or performing one or more reservoir simulations. For example, the well log interpreter (160) may store well logs and data regarding core samples for performing simulations. A reservoir simulator may further analyze the well log data, the core sample data, seismic data, and/or other types of data to generate and/or update the one or more reservoir models. While an well log interpreter (160) is shown at a well site, in some embodiments, the well log interpreter (160) is located away from well site. In some embodiments, the well log interpreter (160) may include a computer system that is similar to the computer system (600) described below with regard to FIG. 6 and the accompanying description.

Figure 2:
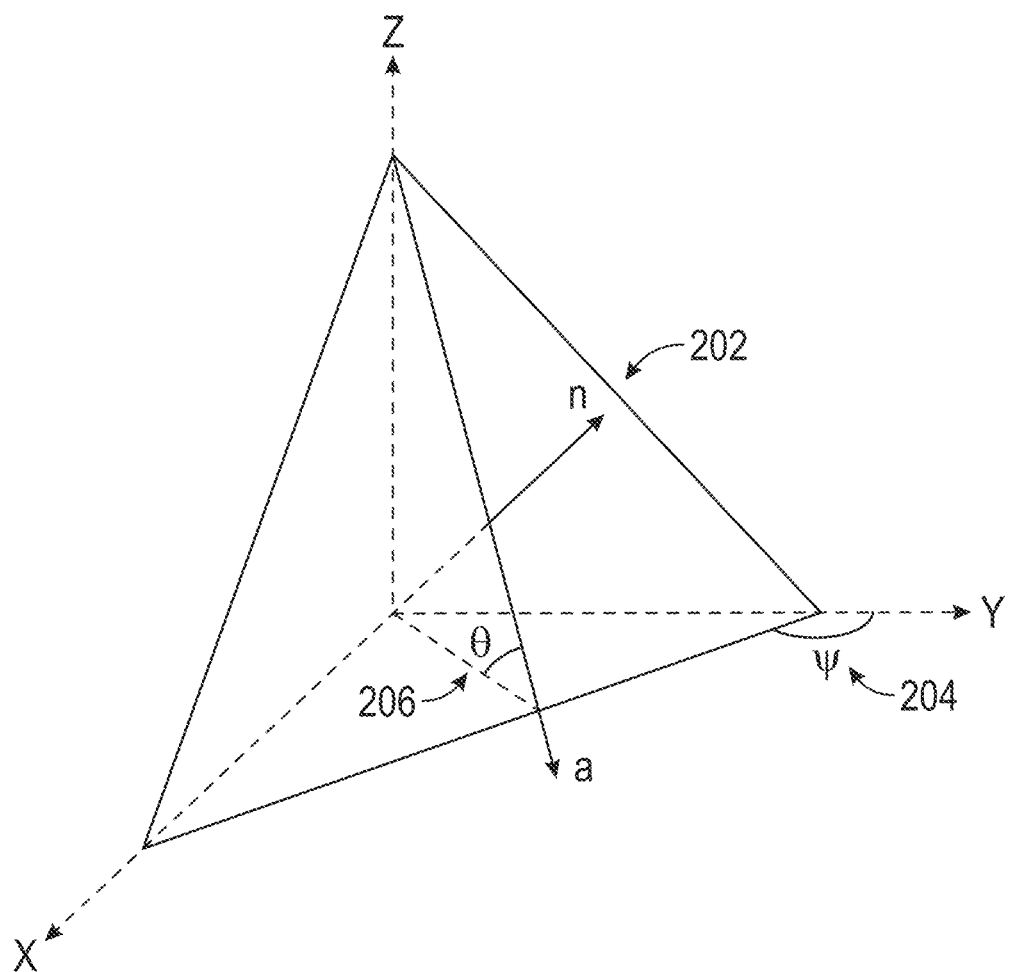
FIG. 2 shows a schematic diagram of a seismic reflector.

FIG. 2 shows a 3D seismic survey that may be used to provide data about the subsurface structure of a region of interest. A seismic source emits artificially-generated acoustic waves into the subsurface, where the geological structures and objects within the Earth's crust reflect this energy back towards the geological surface. The amplitudes of these reflections are determined by acoustic impedance contrasts across the geological surfaces of these geological structures and objects. These reflected seismic waves are recorded by geophones, accelerometers, or hydrophones, and the data is processed to produce a visual representation of the subsurface. Seismic reflection methods in accordance with some embodiments may reveal the three-dimensional geometry of geological structures down to tens of kilometers depth with a resolution of tens of meters or less.

Additionally, a 3D seismic survey provides high resolution images of the structure of the subsurface as it uses densely-recorded data from closely-spaced shots and seismic recorders. For example, seismic waves with bandwidths extending up to 50 Hz seismic energy may resolve thin features. While dependent on an accurate velocity model for the data processing, seismic reflection has the potential to image the subsurface with much more resolution than with refraction methods.

A portion of a 3D seismic reflector (202), such as a formation top or internal bedding surface, may be defined by its orientation information, including a strike ($\psi$) (204) and a dip (θ) (206). The strike (204) of the reflector is the angle between the y-axis and the intersection between different faces, or specifically, the reflector (202) and the horizontal (x, y)-plane. The reflector dip (206) is the angle measured in a vertical plane perpendicular to the strike (204) between the horizontal (x, y)-plane and the interface. For example, a reflector with a zero dip is horizontal and a reflector with a 90-degree dip is vertical.

Figure 3:
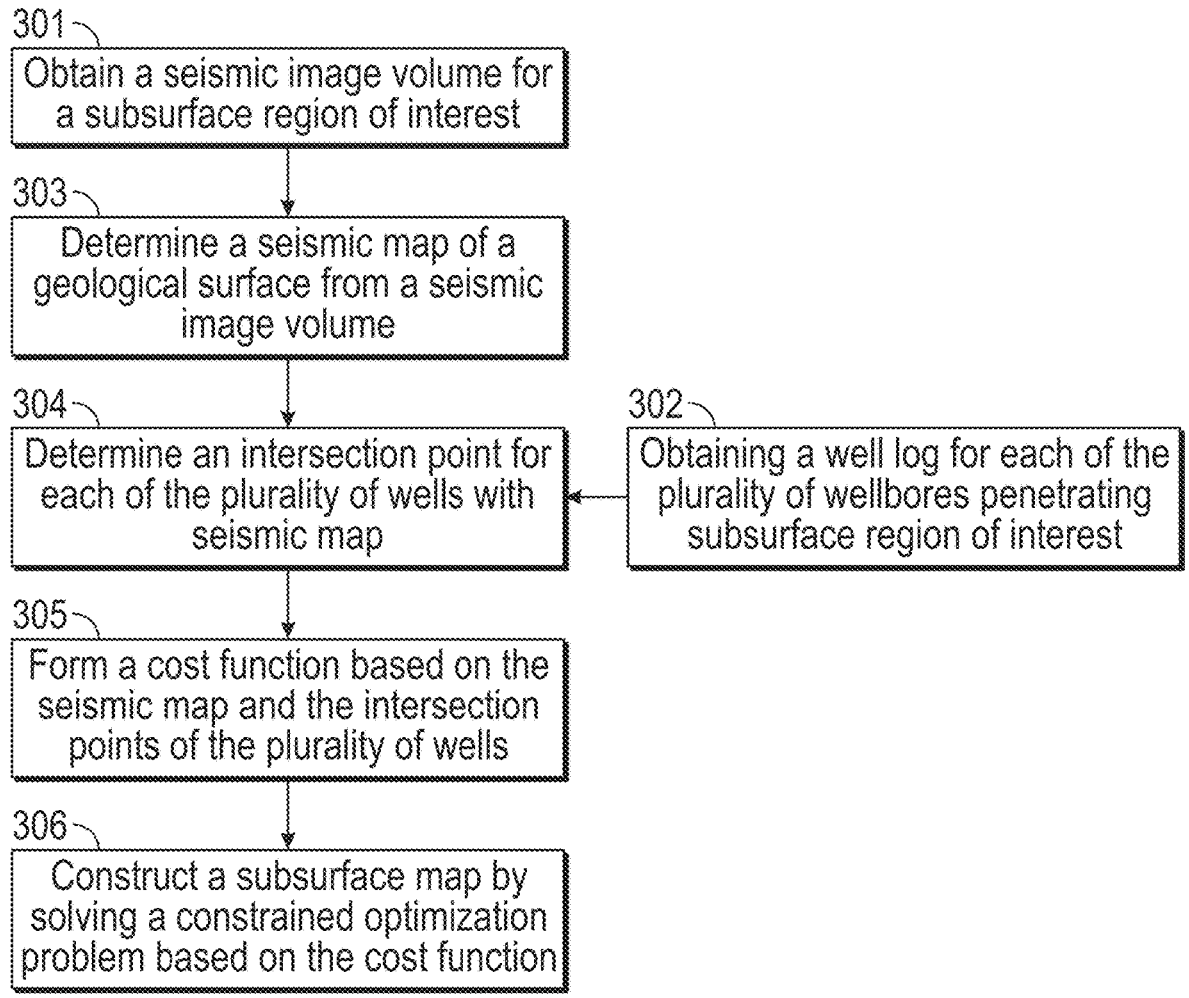
FIG. 3 shows a flowchart in accordance with one or more embodiments.

FIG. 3 shows a flowchart in accordance with one or more embodiments for automatically tying structure maps of subsurface horizons to well-derived orientation information. Specifically, in Block 301, a 3D seismic image volume for the subsurface region of interest may be obtained. The seismic image volume is usually acquired in search for of hydrocarbons. Individual seismic image volume may cover large areas of sedimentary basins, up to tens of thousands of square kilometers in areas with merged volumes extending over a hundred thousand square kilometers. Standard spatial resolution of these volumes yields mapped subsurface for interpretation on a regular Cartesian coordinate with the spacing of 25 m or 12.5 m. The maps of the subsurface are often corrected to match the depth of subsurface horizons determined at all well control locations where wells penetrate the horizon. This process is often called "tying" the subsurface horizons to the wells.

In accordance with one or more embodiments, in Block 302 at least one well log for each of the plurality of wellbores penetrating the subsurface region of interest is obtained. For example, the well logs may be, without limitation, dipmeter logs, electrical image logs, or ultrasonic image logs. Horizon orientation data may be determined from each of a plurality of well logs and the orientation data may be used when creating a map of the horizon structure from seismic interpretation, so that the final grid matches the orientation as well as the depth of the relevant horizon in available wells.

In accordance with one or more embodiments, in Block 303 a seismic map of a geological surface is determined based on the seismic image volume. Specifically, the seismic map may include an estimated depth and an estimated vector normal to the seismic map at a plurality of horizontal locations. Elements of the seismic map can be defined uniquely by a point in space, x=(x, y, z), and a unit normal vector n=($n_x$, $n_y$, $n_z$) to the geological surface, where $n_x$, $n_y$, $n_z$ denote the unit normal vector components along x-axis, y-axis, and z-axis. The seismic map may be defined by a function z=z(x, y).

Continuing with FIG. 3, Block 304 determines an intersection point for each of the plurality of wells with seismic map. Determining the intersection point includes computing a normal unit vector along x-axis and y-axis of the 3D seismic volume at the intersection points. A 3D seismic volume is often described by a Cartesian coordinate system in which x-axis denotes inline direction, y-axis denotes crossline direction, and z-axis denotes depth or time direction. The normal unit vectors along x and y axis are calculated based on the seismic maps derived in Block 303. The unit normal vector at each point x=(x, y, z) on the surface may be calculated by:

$$n_z = \frac{\left(-\frac{\partial z}{\partial x}, -\frac{\partial z}{\partial y}, 1\right)}{\sqrt{\left(\frac{\partial z}{\partial x}\right)^2 + \left(\frac{\partial z}{\partial y}\right)^2 + 1}} \qquad \text{Equation (1)}$$

where the local gradient dz/dx denotes an apparent normal unit vectors along x-axis and dz/dy denotes an apparent normal unit vectors along the y-axis. The apparent normal unit vectors may be computed by the first-order finite difference between adjacent grid nodes.

Further, after obtaining the local dip θ and strike y at the well control point (x, y, z) on the map, the unit normal direction can be computed by $$n_{\theta,\psi} = (-\sin\theta\,\cos\psi,\,\sin\theta\,\sin\psi,\,\cos\theta). \qquad \text{Equation (2)}$$

Theoretically, the mathematical and geological measurements of the subsurface reflector are equivalent or $n_z = n_{\theta,\psi}$. Substituting Equation 2 to Equation 1 gives:

$$\begin{cases} \frac{\partial z}{\partial x} = \frac{\sin\theta\,\cos\psi}{\cos\theta}, \\ \frac{\partial z}{\partial y} = -\frac{\sin\theta\,\sin\psi}{\cos\theta}. \end{cases} \qquad \text{Equation (3)}$$

Further, Block 305 forms a cost function based on a seismic map and the intersection points derived, in Blocks 303 and 304, from the well-measured normal unit vectors at the well location within the radius of influence. The derived gradient is based on the local subsurface gradient and a Gaussian smoothing filter. With the gradient derived from the well-measured normal unit vectors information, shape of the subsurface horizons around the well may be automatically adjusted to match well-measured normal unit vectors information. The updated gradient derived from the orientation information at the well location is incorporated into an interpolation process as a boundary condition. Since the well location is chosen to be one of an interpolation nodes, the updated subsurface map is tied to the orientation information as well as the correct depth at such location.

Block 306 constructs a subsurface map by solving a constrained optimization problem based on a cost function:

$$\min_z \|z(x, y) - u(x, y)\|_2^2 \qquad \text{Equation (5)}$$

$$\text{s.t.} \begin{cases} \frac{\partial z}{\partial x} = \frac{\sin\theta\,\cos\psi}{\cos\theta}, \\ \frac{\partial z}{\partial y} = -\frac{\sin\theta\,\sin\psi}{\cos\theta}, \\ z = u, \end{cases} \qquad \text{Equation (5)}$$

where u(x, y), representing a warped map, is the given interpreted subsurface horizon after being flexed to the correct depth, but not tied to the measured dip θ and strike y, at the well control points. Further, in one or more embodiments the warped map may represent a conventional solution to a problem. The disclosure is not limited in scope with regard to a conventional approach to obtaining the warped map, such as, at least, traditional structural modeling methods using major horizon and fault surfaces and 3D horizontal interpolation with seismic structure features. The cost function $\|z(x, y) - u(x, y)\|_2^2$ in Equation 4 is minimized to generate a new seismic map that is similar to the warped map but, in addition to matching the well log depths determined form the well logs in the plurality of wellbore, also matches the dips and strike determined from the well logs at locations the wellbores intersect the horizon.

Thus, Equation 5 constrains the depth z and the gradient (∂z/∂x, ∂z,∂y) of the calculated seismic map at the well locations to coincide with the depth and orientation information measured from the well locations. This optimization problem from Equation 4 and Equation 5 may be solved by, for example, the Lagrange Multiplier method.

FIG. 4A shows an example of capability of disclosed embodiments that provide for automatic tying of maps to well-measured orientation. Specifically, FIG. 4A displays a structure contour map (400) of the horizon at approximately 4700 ft., covering 2000 m along the x-axis (402) and 2000 m along the y-axis (404), with a well in the center (406). The depth of the horizon at each x and y position is indicated on the grayscale (408). The map is a depth conversion gridded with minimum curvature and tied to the central well in depth but not in orientation. The dip (410), depicted as a short line, and strike (412), depicted as a long line, of the horizon at the well location computed by Equation 2 and Equation 3 are shown on the map with dotted lines. The dip (414) and strike (416) measured from an image log in the well are shown with solid lines. As FIG. 4A shows, seismic derived dip and strike do not align with the well derived dip and strike.

Further, FIG. 4B shows structure map (420) after including the orientation information obtained from well logs in addition to the depth constrain. The strike and dip computed from the subsurface horizon are coincident with the ones measured from the image log. The dip, depicted as a short line, and strike, depicted as a long line measured from the image log and computed from the surface at the central well are equal.

Figure 5B:
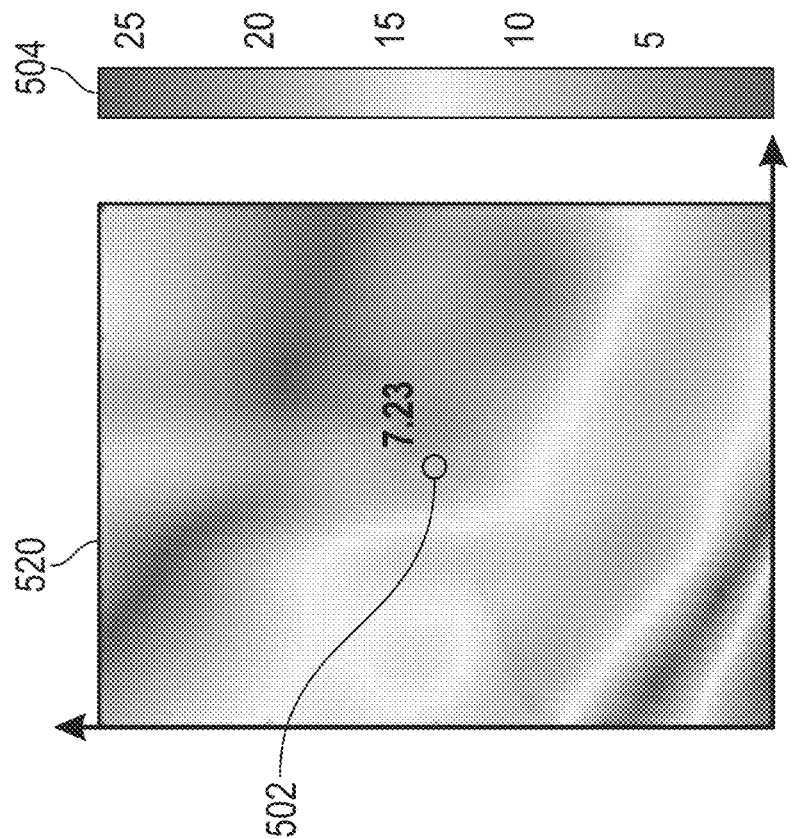
FIGS. 5A and 5B shows dip magnitudes corresponding to subsurface maps.
Figure 5A:
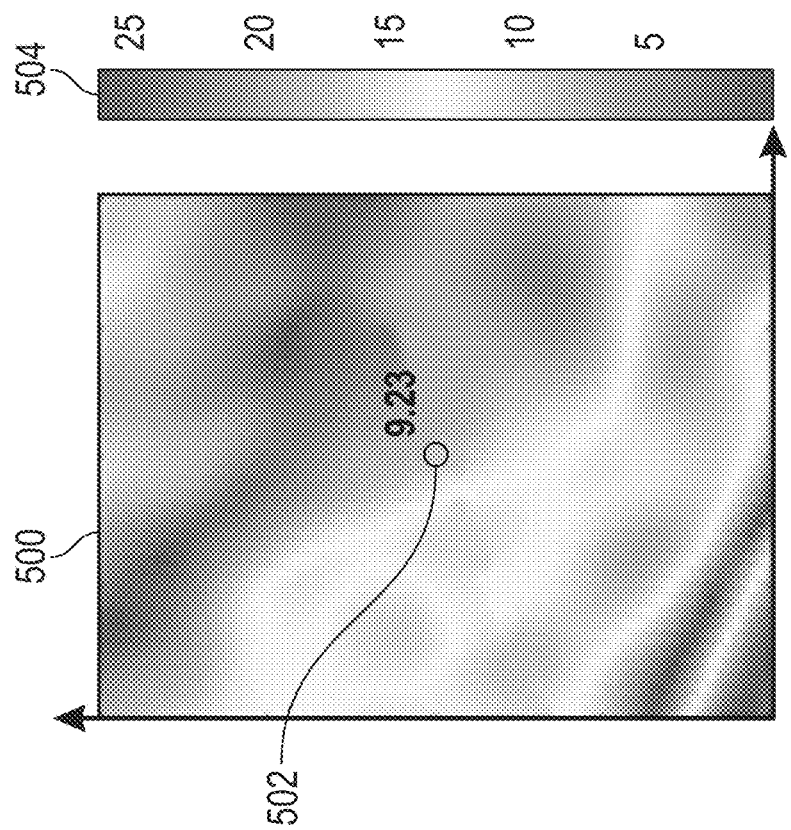

FIG. 5A shows an image of dip magnitude (500) corresponding to the subsurface maps of FIG. 4A and FIG. 5B shows an image of dip magnitude (520) corresponding to the subsurface map of FIG. 4B. The dip magnitude is an angle between the steepest direction of a plane and a horizontal plane, where values range from 0 to 90. The dip magnitude is used for showing overall structural folds and to identify faults with very small displacements. The well location (502) in the center of the image is indicated by the white circle dip magnitudes are indicated on grayscales (504). Compared to the dip magnitude image (500) of the original subsurface map, the dip magnitude image (520) of the updated map shows a clear and continuous pattern that may associates with some structural and stratigraphic features.

The updated subsurface map may be used to determine and drill a wellbore path. The wellbore path may be determined to penetrate a hydrocarbon reservoir, for the purpose of characterizing the hydrocarbon reservoir, or for producing hydrocarbons, or both. Additionally, the updated subsurface allows for identification of small structures and subtle stratigraphic changes in the target horizons. Identifying the small structures and subtle stratigraphic changes in the target horizons is crucial for prospect generation during exploration, effective well placement and geosteering in developmental projects as well as reservoir characterization.

Figure 6:
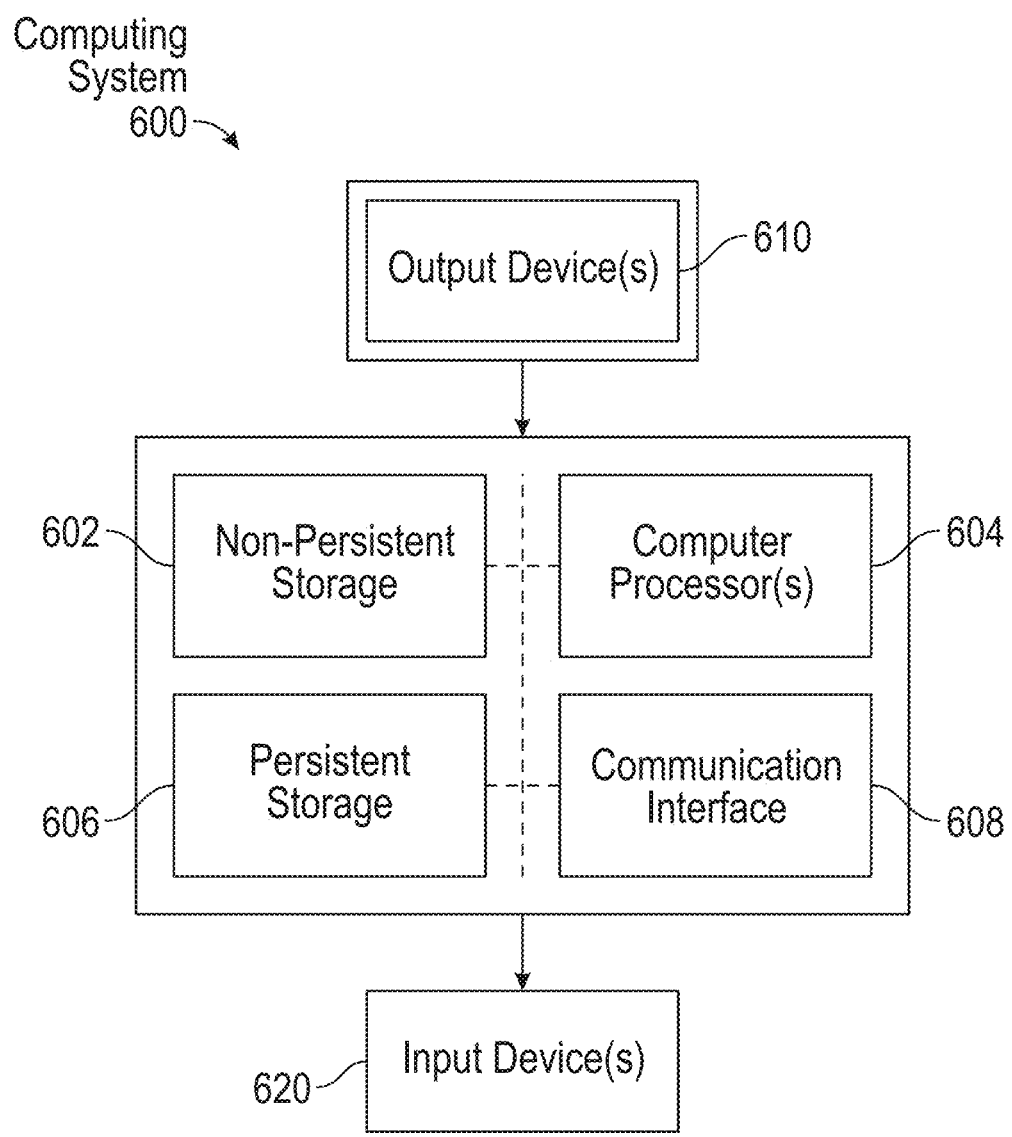
FIG. 6 shows a computer system in accordance with one or more embodiments.

Embodiments may be implemented on a computing system. Any combination of mobile, desktop, server, router, switch, embedded device, or other types of hardware may be used. For example, as shown in FIG. 6, the computing system (600) may include one or more computer processors (604), non-persistent storage (602) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (608) (e.g., Bluetooth interface, infrared interface, network interface, optical interface, etc.), and numerous other elements and functionalities.

The computer processor(s) (604) may be an integrated circuit for processing instructions. For example, the computer processor(s) may be one or more cores or micro-cores of a processor. The computing system (600) may also include one or more input devices (620), such as a touchscreen, keyboard, mouse, microphone, touchpad, electronic pen, or any other type of input device.

The communication interface (608) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (610), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (604), non-persistent storage (602), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

While the disclosure has been described with respect to a limited number of embodiments, those skilled in the art, having benefit of this disclosure, will appreciate that other embodiments may be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, it is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
   obtaining, using a seismic acquisition system, a seismic image volume for a subsurface region of interest;
   obtaining, using a logging system, a well log for each of a plurality of wellbores penetrating the subsurface region of interest;
   determining, using a computer system, a seismic map of a geological surface from the seismic image volume, wherein the seismic map comprises an estimated depth and an estimated vector normal to the seismic map at a plurality of horizontal locations;

determining, using the computer system, an intersection point for each of the plurality of wellbores with the geological surface, wherein the intersection point comprises a depth, a horizontal location, and a strike and a dip of the geological surface;

forming, using the computer system, a cost function based, at least in part, on the seismic map and the intersection points of the plurality of wellbores; and constructing, using the computer system, a subsurface map by solving a constrained optimization problem based on the cost function;

determining, using the computer system and based, at least in part, on the constructed subsurface map, a wellbore path configured to penetrate a hydrocarbon reservoir; and drilling, using a drilling system, along the wellbore path, wherein forming the cost function further comprises:

determining a warped map of the geological surface based, at least in part, on the seismic map and the depth of the intersection point for each of wellbore with the geological surface; and forming the cost function based, at least in part, on a square of a difference between the estimated depth of the seismic map and a depth of the warped map summed over a plurality of horizontal location, and on the vector normal to the seismic map and the strike and dip of the geological surface at the intersection point for each of the plurality of wellbores.

2. The method of claim 1, further comprising:

determining, at each intersection point, a measured vector normal to the geological surface based on the dip and the strike of the geological surface; and setting the vector normal to the seismic map in a region surrounding each intersection point equal to the measured vector normal to the geological surface.

3. The method of claim 1, wherein the dip and the strike are measured from an image log.

4. The method of claim 1, wherein solving the constrained optimization problem comprises applying a Lagrange Multiplier method to the problem.

5. The method of claim 1, wherein the seismic map comprises a plurality of triangular facets each with a unit vector to the facet.

6. A non-transitory computer readable medium storing instructions executable by a computer processor, the instructions comprising functionality for:

obtaining a seismic image volume for a subsurface region of interest;

obtaining a well log for each of a plurality of wellbores penetrating the subsurface region of interest;

determining a seismic map of a geological surface from the seismic image volume, wherein the seismic map comprises an estimated depth and an estimated vector normal to the seismic map at a plurality of horizontal locations;

determining an intersection point for each of the plurality of wellbores with the geological surface, wherein the intersection point comprises a depth, a horizontal location, and a strike and a dip of the geological surface;

forming a cost function based, at least in part, on the seismic map and the intersection points of the plurality of wellbores;

constructing a subsurface map by solving a constrained optimization problem based on the cost function;

determining, based at least in part, on the constructed subsurface map, a wellbore path configured to penetrate a hydrocarbon reservoir;

drilling, using a drilling system, along the wellbore path, wherein forming the cost function further comprises:

determining a warped map of the geological surface based, at least in part, on the seismic map and the depth of the intersection point for each of wellbore with the geological surface; and forming the cost function based, at least in part, on a square of a difference between the estimated depth of the seismic map and a depth of the warped map summed over a plurality of horizontal location, and on the vector normal to the seismic map and the strike and dip of the geological surface at the intersection point for each of the plurality of wellbores.

7. The non-transitory computer readable medium of claim 6, further comprising:

determining, at each intersection point, a measured vector normal to the geological surface based on the dip and the strike of the geological surface; and setting the vector normal to the seismic map in a region surrounding each intersection point equal to the measured vector normal to the geological surface.

8. The non-transitory computer readable medium of claim 6, wherein the dip and the strike are measured from an image log.

9. The non-transitory computer readable medium of claim 6, wherein solving the constrained optimization problem comprises applying a Lagrange Multiplier method to the problem.

10. The non-transitory computer readable medium of claim 6, wherein the seismic map comprises a plurality of triangular facets each with a unit vector to the facet.

11. A system comprising:

a logging system coupled to a plurality of logging tools;

a well log interpreter comprising a computer processor, wherein the well log interpreter is coupled to the logging system, the well log interpreter comprising functionality for:

obtaining a seismic image volume for a subsurface region of interest;

obtaining, a well log for each of a plurality of wellbores penetrating the subsurface region of interest;

determining a seismic map of a geological surface from the seismic image volume, wherein the seismic map comprises an estimated depth and an estimated vector normal to the seismic map at a plurality of horizontal locations;

determining an intersection point for each of the plurality of wellbores with the geological surface, wherein the intersection point comprises a depth, a horizontal location, and a strike and a dip of the geological surface;

forming a cost function based, at least in part, on the seismic map and the intersection points of the plurality of wellbores; and constructing a subsurface map by solving a constrained optimization problem based on the cost function;

determining, based at least in part, on the constructed subsurface map, a wellbore path configured to penetrate a hydrocarbon reservoir, wherein forming the cost function further comprises:

determining a warped map of the geological surface based, at least in part, on the seismic map and the depth of the intersection point for each of wellbore with the geological surface;

forming the cost function based, at least in part, on a square of a difference between the estimated depth of the seismic map and a depth of the warped map summed over a plurality of horizontal location, and on the vector normal to the seismic map and the strike and dip of the geological surface at the intersection point for each of the plurality of wellbores, and a drilling system, coupled to the logging system and the well log interpreter, configured to drill along the wellbore path.

12. The system of claim 11, further comprising:

determining, at each intersection point, a measured vector normal to the geological surface based on the dip and the strike of the geological surface; and setting the vector normal to the seismic map in a region surrounding each intersection point equal to the measured vector normal to the geological surface.

* * * * *